(12) United States Patent
Shaik (10) Patent No.: US 7,088,821 B2
(45) Date of Patent: Aug. 8, 2006

(54) ABSOLUTE PUBLIC KEY CRYPTOGRAPHIC SYSTEM AND METHOD SURVIVING PRIVATE-KEY COMPROMISE WITH OTHER ADVANTAGES

(75) Inventor: Cheman Shaik, P.O. Box 56565, Riyadh (SA) 11564

(73) Assignee: Cheman Shaik, Riyadh (SA)

( * ) Notice: Subject to any disclaimer, the term of this patent is extended or adjusted under 35 U.S.C. 154(b) by 545 days.

(21) Appl. No.: 09/847,503

(22) Filed: May 3, 2001

(65) Prior Publication Data

US 2002/0186848 A1     Dec. 12, 2002

(51) Int. Cl.
*H04L 9/30* (2006.01)
(52) U.S. Cl. .............................. 380/30; 380/28; 380/33; 713/163; 713/180
(58) Field of Classification Search ................ 713/163, 713/180; 380/28, 30, 33
See application file for complete search history.

(56) References Cited

U.S. PATENT DOCUMENTS 6,084,965 A * 7/2000 Ahn et al. ..................... 380/28
6,810,122 B1 * 10/2004 Miyazaki et al. ............. 380/30

OTHER PUBLICATIONS

Moore, Judy H.; "Protocol Failures in Cryptosystems", May 1988; Proceedings of the IEEE, vol. 76, No. 5; pp. 594-602.*
Shamir, Adi; "RSA for Paranoids"; Autumn, 1995; CryptoBytes, pp. 1-16.*

* cited by examiner

*Primary Examiner*—Gilberto Barron
*Assistant Examiner*—Jung Kim (57) ABSTRACT

The present invention presents a public key cryptographic system and method called Absolute Public Key Cryptography that survives private key compromise and offers two-way communication security. Communications are secured even when the private key is revealed. It provides security to the private-to-public side communications and also allows short keys to be used with mobile devices that have low processing power. The system uses keys with two or more components and encrypts a message into the same number of cipher versions. The cipher versions are delivered to the destination in source routing mode, or hop-by-hop routing mode with a small time gap. The recipient performs certain mathematical operations on all the cipher versions and obtains the original message. All the versions are necessary for obtaining the original message. Even a single version missing leads to produce a junk for an attacker. As an attacker at an intermediary IP router can not have all the cipher versions available, he can not obtain the original message even when he knows the private key. This is why the system is called Absolute Public Key Cryptography. The robustness against private key compromise is achieved by blinding the public key through adding a random number to each of its components before encryption. When the encryption process is complete, the random number is discarded and the cipher versions are delivered to the recipient. The effect of blinding is made void by the actual intended recipient, who has all the cipher versions available. Robustness is also achieved another way, that is, by choosing the encrypting key such that each of its components has a common factor with Euler Totient Function of the key modulus, and there is no common factor among all the components. This makes it harder for an attacker to decrypt a single cipher version of the message into the original message and thereby allows smaller keys to be used for mobile communications. Communication in both directions is secured by using two different key pairs, one for public-to-private-side and the other for private-to-public-side communications.

6 Claims, 6 Drawing Sheets

Flow chart showing encryption and decryption steps of algorithm.1

FIG. 1 Cryptographic process of the method

FIG. 3 Flow chart showing encryption and decryption steps of algorithm.1

FIG. 4 Flow chart showing encryption and decryption steps of algorithm.2

FIG. 5 Flow chart showing steps of key computation for algorithm.1

FIG. 6 Flow chart showing steps of key computation for algorithm.2

ABSOLUTE PUBLIC KEY CRYPTOGRAPHIC SYSTEM AND METHOD SURVIVING PRIVATE-KEY COMPROMISE WITH OTHER ADVANTAGES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND

Eavesdropping is intercepting the data traversing the Internet at an intermediary point and reading the contents. Eavesdropping is becoming possible on the Internet because the data from one end has to travel to the other through a number of intermediary nodes called routers, which are neither under the control of the sender nor under that of the recipient at the destination. Eavesdroppers use a sniffer to intercept the data arriving at a router en route the destination. A sniffer is a program and/or device that monitors data passing through a network. Sniffers are easily available in the market as tools providing legitimate network management functions. Unfortunately, hackers misuse them for stealing information off a network. Unauthorized sniffers can be extremely dangerous to a network's security, as they are virtually impossible to detect.

Cryptography is a wise technique widely employed in protecting Internet communications and e-commerce transactions to defeat eavesdropping. Basically it involves two steps—data encryption on the sender side and decryption on the recipient side. Cryptography algorithms are classified into Symmetric and Asymmetric, or Private-key and Public-key. Private-key algorithms use the same key for both encryption and decryption, and are not suitable for today's web-based systems involving many strange participants everyday. It is hard to share secret keys, as they need a secure channel for distribution.

The shortcomings of the private-key algorithms are overcome by the public-key algorithms, which use different keys, called public and private, for encryption and decryption. The two keys are mathematically related to each other, and not easily deducible one from the other.

One of the best known and most widely used public key algorithms is the RSA algorithm named for its creators Rivest, Shamir, and Adleman. The original RSA algorithm is described in U.S. Pat. No. 4,405,829, entitled "Cryptographic Communications System and Method" issued on Sep. 20, 1983 in the names of Rivest, Shamir, and Adleman. This patent is incorporated by reference as background information.

The RSA algorithm for encryption and decryption is given as follows:

RSA Encryption: $C = M^e \mod n$, where M is original message and C is ciphertext.

RSA Decryption: $M = C^d \mod n$, where p and q are two prime numbers, and $n = p.q$, and e is a number relatively prime to $(p-1).(q-1)$.

The value $(p-1).(q-1)$ is called Euler Totient Function of n and represented by phi. mod operator represents the remainder left when the left hand operand is divided by the right hand operand.

d is called multiplicative inverse of e, which satisfies the relation $e.d = k.phi + 1$ for any integer k. For large e values, d value can be computed using Extended Euclid's Algorithm. p, q and phi are discarded once d is computed. The pair (e,n), called public key, is revealed to the public. d is called private key and maintained in strict confidence. To compute d from (e,n), one has to perform nearly square-root(n) modular operations, which would take several years for large keys.

Data encrypted by one key can be decrypted only by the other. Encryption and decryption involve exponential modular arithmetic operations on a number that is a function of the original message.

Public-key Cryptography has emerged into a superior technology over the Private-key Cryptography because of its suitability to e-commerce with its capabilities, such as data integrity and non-repudiation. Another public key algorithm widely known is ECC (Elliptic Curve Cryptography).

Unfortunately, even public key cryptography has its own shortcomings. A weakness of the present-day public key algorithms is that they do not survive the private-key compromise attacks following an internal breach of trust. In reality, this is what is happening in today's competitive business environment. Security administrators of well established e-commerce companies resorting to accept the lucrative bribes offered by the competitors make void the security potential of the present day public-key cryptography algorithms, such as RSA and ECC. Once a breach takes place in business, and subsequently the private key of the business is revealed, the public-key algorithms become no more useful, because the degree of security that RSA and ECC offer to communications after private key compromise is zero. The revealed key may be used by the competitor, or the attacker to decipher the intercepted data at an intermediary router. If a Certifying Authority's private key itself is compromised, the event should be considered catastrophic. Immediately, the CA must cease issuing new certificates under the key and the old certificates must be recalled and reissued using a new key.

Another weakness of the public key algorithms is they secure only the public-to-private-side communications and fail to protect the private-to-public-side communications. To illustrate, suppose Bob, Chris and David are sharing Alice's public key. When Bob sends a message to Alice, Chris and David can not eavesdrop on their communication, as they do not know Alice's private key, which is necessary to decrypt the data. But the converse is not true, that is, when Alice sends a message to Bob, Chris and David can eavesdrop on their communication and successfully read the message. This is because Chris and David share the same public key of Alice with Bob, which is necessary for decryption this time.

The mathematical approach of breaking RSA ciphertext is to factor the key modulus, a very large number, into two primes, which requires several years of computation, some times even millions of years. For large keys, this is too difficult a task for an attacker and is quite impractical unless he has several thousands of machines to be engaged in parallel computing. However, there is another approach to breaking RSA, ECC or any other such ciphertext—bribing the security administrators or the private key guarding employees to reveal the key. This weakness of the public key algorithms calls for a better concept and approach towards performing the cryptographic operations on Internet communications.

BRIEF SUMMARY

This invention relates to cryptographic systems, computers, and computer-implemented methods for performing encryption and decryption operations. More particularly, this invention relates to a cryptographic system that survives private key compromise and provides two-way communication security. This system also allows smaller keys to be used with mobile devices with less powerful processors.

DETAILED DESCRIPTION OF THE INVENTION

Absolute Public-key Cryptography is a new technique, which overcomes the shortcomings of public key cryptography. It survives private key compromise and protects the business from undergoing bankrupt following an internal breach of trust in maintaining the confidentiality of the private key. While surviving private key compromise, it provides an extra layer of security over Internet communications when the private key is kept secret.

Another advantage of Absolute Public-key Cryptography is it provides two-way communication security. When Alice sends a message encrypted by her private key to Bob, only Bob can decrypt it with Alice's public key. Chris and David, who share Alice's public key with Bob can not decrypt the message. Public key cryptography does not support this private-to-public side communication security.

In Absolute Public-key Cryptography, both public key and private key contain two or more components. Data is encrypted into as many cipher versions as there are number of key components, and each version is delivered to the destination as a separate set of packets. The delivery may be performed in two ways, hop-by-hop routing or source routing. In hop-by-hop routing, a small time gap of few milliseconds between every two consecutive cipher versions should be maintained. Such a time gap mostly ensures that all the cipher versions do not meet at a single router before they reach the destination. Source routing does not require any time gap, and it fully ensures that all the cipher versions do not meet at a single router before the destination. Source routing is an IP option that specifies the routing path on a data packet that it will follow to the destination. All the cipher versions are received at the destination host and passed through a mathematical process that decrypts them into the original message. On each of these versions, an exponential modular operation is performed with the corresponding private key component, and finally a multiplicative modular operation is performed among all these resulting values to obtain the original message. All the cipher versions are identified as belonging to the same message by means of a message identifier, which is the same in all cipher versions. The message identifier is not encrypted by the sender. All the cipher versions are necessary to obtain the original message. Even if a single version is missing, the decryption process produces junk. This serves as a security advantage for the data transfer between the two ends. Private key in Absolute Public-key Cryptography is called Robust Private-key since it is invulnerable to compromise attacks.

Absolute Public Key Cryptography enjoys the Internet routing architecture. It draws its extra strength and security potential from the routing mechanism of packet switching networks on the Internet.

The Internet is constituted of several packet switching networks. Packet switching refers to protocols in which messages are fragmented into small packets. Each packet is transmitted individually across the net. The packets traverse a number of networks along the way. If several cipher versions are sent, all to the same recipient, they may each travel a different group of networks. In fact, all the packets within a single cipher version may not travel the same route of networks.

Each packet delivered from the sender follows a convenient route to its destination. Along the convenient route, the packet has to pass through a number of intermediary routers. The next hop from the current router in the convenient route is decided by the information in routing tables of the current router. The routing information changes every nanosecond at a router depending upon the load and traffic conditions at the surrounding routers, thereby directing different packets through different routes to their final destination. This is what, in hop-by-hop routing, mostly ensures that all the cipher versions do not meet at a single router before the destination. On the other hand, in source routing, one can strictly specify the routing path on a data packet that it will follow to the destination. This fully ensures that all the cipher versions do not meet at a single router before the destination. This is what makes the Absolute Public-key Cryptography extensively strong against private-key compromise due to internal breach of trust.

An attacker intercepting the traffic at a router does not have all the cipher versions available at the same router. Even in a situation where a single cipher version of the message is missing, an attacker's decryption at the router produces junk. Decryption will not be complete unless all cipher versions of the original data participate in the process.

In the implementing algorithms, encryption can be performed in two ways while decryption process is the same in both. The two types of encryption are Blind-key Encryption and Relative Composite-key Encryption, based on which two different algorithms are presented here below.

A. Blind-key Encryption Algorithm (Algorithm.1)

In this scheme, the relations between the key components are as follows.

$$e_1 d_1 + e_2 d_2 = k_1 \phi + 1 \qquad \text{Eqn}(1)$$

$$d_1 + d_2 = k_2 \phi, \qquad \text{Eqn}(2)$$

where the terms are defined as follows:

$\phi$—Euler Totient Function of n, the key modulus $e_1, e_2$ n—Public key $d_1, d_2$—Robust Private key $k_1, k_2$—Some integers phi and n are inter related as follows:
n=p.q, where p and q are two prime numbers
phi=(p−1).(q−1)

p, q and phi are discarded after keys are computed.

Actually, when a message is encrypted, it is not encrypted directly with the original public key ($e_1$, $e_2$, n). Instead, it is encrypted with a blind key—($e_1+t$, $e_2+t$, n), where t is a random number generated on the sender's machine before encryption. t is discarded after encryption is completed and not passed to the receiver along with the cipher versions.

Encryption and decryption are performed according to the following steps.

The sender encrypts the numerical equivalent of his message—M (<n) into two cipher versions $M_1$ and $M_2$ by performing exponential modular operations on M as follows:

$$M_1 = M^{(e_1+t)} \bmod n \text{ and} \quad \text{Eqn(3)}$$

$$M_2 = M^{(e_2+t)} \bmod n \quad \text{Eqn(4)}$$

$M_1$ and $M_2$ are delivered to the receiver.

The receiver computes $N_1$ and $N_2$ similarly as follows:

$$N_1 = (M_1)^{(d_1)} \bmod n \text{ and} \quad \text{Eqn(5)}$$

$$N_2 = (M_2)^{(d_2)} \bmod n \quad \text{Eqn(6)}$$

Next, the receiver performs multiplicative modular operations on $N_1$ and $N_2$ and computes N as follows:

$$N = N_1 . N_2 \bmod n \quad \text{Eqn(7)}$$

This ends the cryptographic process on both sides. At the end of the above process, the N value obtained by the receiver is the same as M, the original message.

The equality N=M may be proved mathematically as follows.

From Eqn(7) $N = N_1 . N_2 \bmod n$

Substituting for $N_1$ and $N_2$ from Eqn(5) and Eqn(6) in the above, $N = [(M_1)^{(d_1)} \bmod n . (M_2)^{(d_2)} \bmod n] \bmod n$ According to modular arithmetic properties the above equation simplifies to $N = [(M_1)^{(d_1)} . (M_2)^{(d_2)}] \bmod n$ Substituting for $M_1$ and $M_2$ in the above from Eqn(3) and Eqn(4), $N = [(M^{(e_1+t)} \bmod n)^{(d_1)} . (M^{(e_2+t)} \bmod n)^{(d_2)}] \bmod n$ Again, according to modular arithmetic properties the above equation simplifies to $N = [(M^{(e_1+t)})^{(d_1)} . (M^{(e_2+t)})^{(d_2)}] \bmod n$ Rearranging the exponents in the above, $N = [(M^{(e_1 . d_1)}) . (M^{(e_2 . d_2)}) . (M^{(t . d_1 + t . d_2)})] \bmod n$ Substituting Eqn(1) and Eqn(2) in the above, $N = [M^{(k_1 . phi + 1 + t . k_2 . phi)}] \bmod n$ Simplifying the exponent in the above, $N = [M^{(k_3 . phi + 1)}] \bmod n$, where $k_3 = k_1 + t . k_2$ According to Euler's theorem in Number theory, $M^{(k . phi + 1)} \bmod n = M$ for any M, k and n when M and n are relatively prime, where phi is the Euler Totient Function of n.

Hence, N=M

The above proof holds good for not only two key components and two cipher versions. It can be proved for any number of key components and the same number of cipher versions.

Interestingly, it can be seen from the above proof that the effect of blinding the original public key with a random number t on the sender's machine is neutralized when all cipher versions of the message participate in the process of decryption. This feature of the algorithm imparts excellent security to the messages. An attacker at an intermediary router with access to only one cipher version can not decrypt it unless he gets hold of all the other versions. When the key has more than two components, even a single cipher version missing would lead to produce junk in the decryption process. A machine on one routing path may at the most have access to one cipher version, especially in source routing. It has no access to the other cipher versions passing through the other routing paths unless the machines on these paths are free for intrusion for installing a sniffer.

It is suggested that, to achieve better security in hop-by-hop routing mode, every two consecutive cipher versions of the message be delivered with a time gap of few milliseconds. No specific time gap is required in source routing mode. Source routing is more preferable as it fully ensures that all the cipher versions do not meet at a single router before their destination. In source routing, the paths are so selected that they all do not meet concurrently at a single router before destination. An attacker who wants to obtain the original message from a single encrypted version of it has to try different possible values of t, the blinding number. A multiplicative inverse has to be computed for each $e_1+t$ or $e_2+t$, and an exponential modular operation needs to be performed with each of these as the decrypting exponent like in RSA attacks. One of the exponents will yield the original message. But the attacker never knows as to which particular t value yields the right message. The searching range of t for an attacker is (−min($e_1$, $e_2$) to phi). Since the order of phi is same as n, the attacker has to perform nearly n mathematical operations where as RSA system requires only square-root(n) operations. Moreover, the mathematical operations are more expensive than the modular operations of the RSA. Therefore, the security factor of this cryptographic system over RSA is more than square-root(n). For example if a 512 bit key is used for encryption, breaking the ciphertext of this cryptographic system takes more than $2^{256}$ times the period as required by RSA.

RSA algorithm requires only factoring of n into p and q for finding the private key. Once factoring becomes successful, phi can be computed, and subsequently the private key. This requires only square-root(n) modular operations. On the other hand, for attacks on Absolute Public-key Cryptography messages, an attacker lacking at least one cipher version has to try decryption with any selected cipher version out of the available. This needs to run the Extended Euclid's algorithm nearly phi times for finding the multiplicative inverses of all possible $e_i+t$, assuming the i th cipher version is selected. Each run of the algorithm involves several subtraction, multiplication and division operations. Once the multiplicative inverses are computed, the attacker has to try decryption with each of these as the exponent like in RSA attacks. Each decryption involves several exponential modular operations, which are more expensive than simple modular operations. Moreover, there is no way of identifying the original message out of all the resulting decryptions. Even the compromised Robust Private-key will not help in obtaining the original message unless the attacker acquires all the cipher versions of the message. Acquiring all the cipher versions is practically not feasible unless the attacker gets control over all the IP routers around the sender or the recipient.

The following simple illustration demonstrates the Blind-key Encryption Algorithm.

| Let p = 3 | q = 5 | n = p.q = 3.5 = 15 | phi = (3 − 1).(5 − 1) = 8 |
|---|---|---|---|

The values 4, 5, 7 and 11 for e.sub.1, d.sub.1, e.sub.2 and d.sub.2 respectively satisfy the two necessary key component equations e.sub.1.d.sub.1+e.sub.2.d.sub.2=k.sub.1.phi+1
d.sub.1+d.sub.2=k.sub.2.phi
where k.sub.1=12, and k.sub.2=2.

Let the original message be a single character 'C' for simplicity.

Map the character 'C' to the number 3. So M=3
Select a random number, t=3
Now, the Blind Encryption Key, (e.sub.1+t, e.sub.2+t, n)≡(7, 10, 15)
M.sub.1=3.sup.7 mod 15=12
M.sub.2=3.sup.10 mod 15=9

When the receiver receives the values 12 and 9, he will perform the following computations using the Robust Private-key (5, 11, 15)
N.sub.1=12.sup.5 mod 15=12
N.sub.2=9.sup.11 mod 15=9
M=N=12.9 mod 15=108 mod 15=3

Hence, the original message value 3 is obtained and may be mapped again to 'C'.

B. Relative Composite-key Algorithm (Algorithm.2)

In Relative Composite-key Algorithm, no blinding is done with a random number. Instead, the key components e.sub.1 and e.sub.2 are so selected that each of them has a separate common factor with phi, but relatively prime to each other. Note that if both common factors are not relatively prime to each other, a private key does not exist for decryption by the intended recipient.

The key equation to be satisfied in this scheme is simply
e.sub.1.d.sub.1+e.sub.2.d.sub.2=k.sub.1.phi+1,
where the terms are defined as follows:
phi-Euler Totient Function of n, which is the key modulus
e.sub.1, e.sub.2, n—Public key
d.sub.1, d.sub.2—Robust Private key
k.sub.1—Some integer For example, the following set of values satisfies the above equation and the necessary conditions.

| p = 3 | q = 7 | n = 21 | phi = 12 | k.sub.1 = 5 |
|---|---|---|---|---|
| e.sub.1 = 3 | d.sub.1 = 17 | e.sub.2 = 2 | | d.sub.2 = 5 |

Here, encryption is performed without blinding the public key, and two cipher versions are generated. Decryption is performed by the recipient following the same steps as in the previous algorithm. Though no blinding is performed, this method also guarantees good security against attacks on a single cipher version of the message. While it can be very well used for e-commerce transactions, it is specially suitable for mobile commerce transactions, as this allows small keys for encryption and decryption. Though the keys are small, there is no security threat from computational aspect. In fact, when keys are small, for finding a multiplicative inverse for e.sub.1 or e.sub.2 individually and trying to decrypt a single cipher version into the original message, one requires only a few milliseconds as in the RSA attacks. Fortunately, e.sub.1 and e.sub.2 as selected in this encryption scheme do not have individual multiplicative inverses as they each have a common factor with the Euler Totient Function, phi. Even the compromised Robust Private-key will not help the attacker unless he obtains both the cipher versions. From a single cipher version of the message, it is practically infeasible to obtain the original message.

The small size keys of this scheme are especially useful for encryption in mobile devices like GSM handsets and smart cards, which lack the ability to perform heavy exponential modular arithmetic operations with large keys.

The following simple illustration demonstrates the cryptographic process involved.

Let the original message be a single character 'C' for simplicity.

Map the character 'C' to the number 3. So M=3
Now, the encryption key, (e.sub.1, e.sub.2,n)=(3, 2,21)
M.sub.1=3.sup.3 mod 21=6
M.sub.2=3.sup.2 mod 21=9

When the receiver receives the values 12 and 9, he will perform the following computations using the Robust Private-key (17, 5, 21)
N.sub.1=6sup.17 mod 21=6
N.sub.2=9.sup.5 mod 21=18
M=N=6.18 mod 21=108 mod 21=3

Hence, the original message value 3 is obtained and may be mapped again to 'C'.

C. Multiple-Component Keys

As discussed earlier, the number of components of the keys need not be limited to two. Multiple component keys can be used to further improve the security. The governing key equations in this case for Blind-key Encryption are as follows:
SUM(e.sub.1.d.sub.i)=k.sub.1.phi+1 and
SUM(d.sub.i)=k.sub.2.phi, where i=1 to r.

The first equation is called orthogonality of encrypting and decrypting keys while the second may be known as condition of equilibrium among the decrypting key components.

The governing key equation for the Relative Composite-key Encryption scheme is as follows:
SUM(e.sub.i .d.sub.i)=k.sub.1.phi+1

Every e.sub.i must be selected such that it has a common factor with phi. But there should not be a common factor for all e.sub.i and phi. This condition may be referred as relative compositeness of encrypting key components.

Multiple component keys further improve security and speed for electronic and mobile commerce transactions. A small multiple-component key considerably brings down the computational overhead while increasing the size of data produced on encryption. The increased size of data delivered in wireless communications may not cause a striking affect and can be overweighed by the speed and security achieved. Even in e-commerce communications this may not cause much traffic overhead on the IP routers, as there are thousands of IP routers on the Internet.

D. Private-to Public-side Communication Security

Communication from private to public side can be secured by using a separate key pair for encryption and decryption. While generating such a key pair, the equilibrium condition should be imposed on the public key, which is the decrypting key this time. This allows blinding of the private key components before encryption and thereby prevents one eavesdropping on the others' messages. In the case of Relative Composite key Algorithm, relative compositeness should be imposed on the private key.

E. Key Generation

Figure 5:
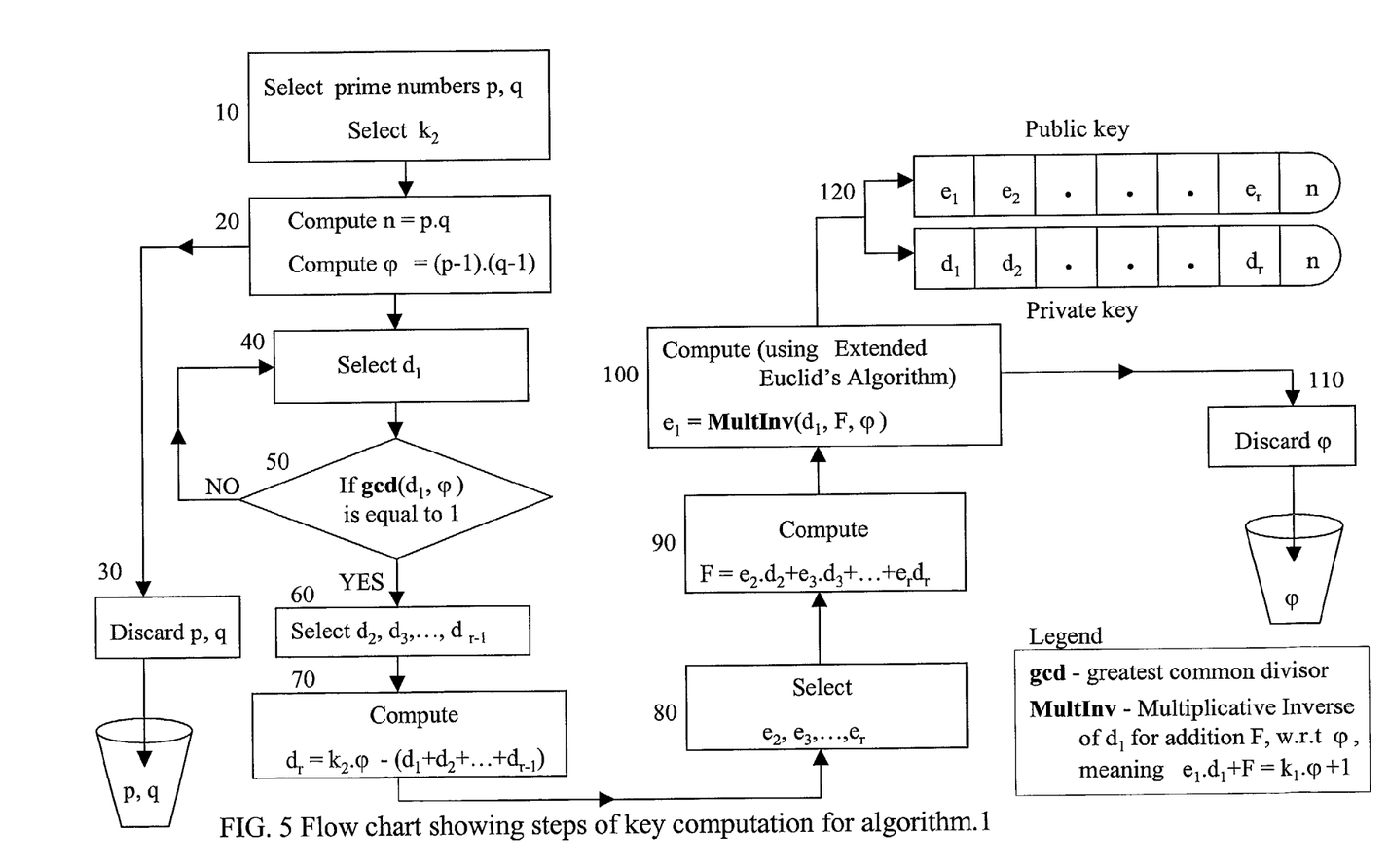
FIG. 5 Flow chart showing steps of key computation for algorithm.1
Figure 6:
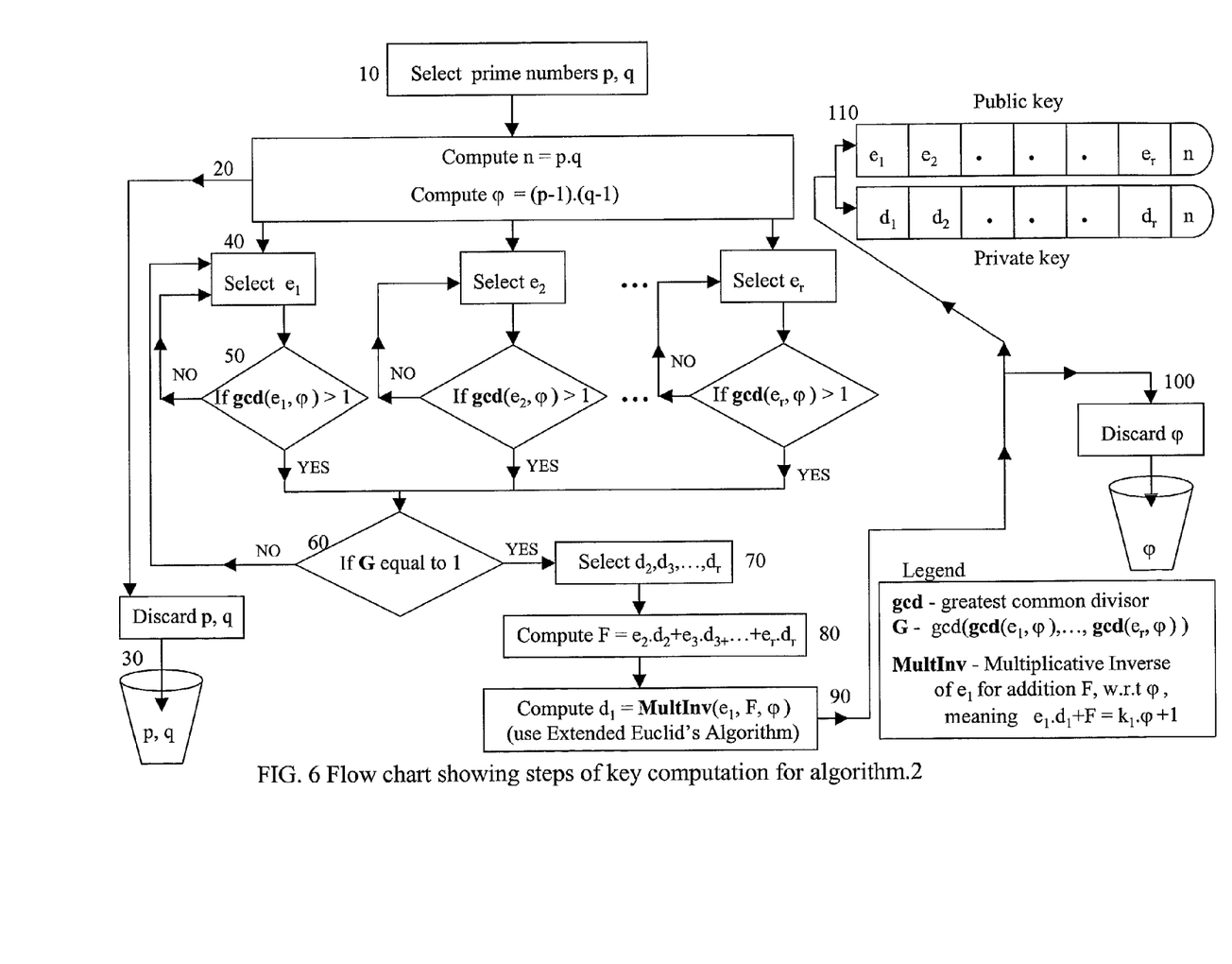
FIG. 6 Flow chart showing steps of key computation for algorithm.2

Large encryption and decryption keys for both the algorithms can be generated using Extended Euclid's Algorithm, which involves computing greatest common divisors and multiplicative inverses. The key generation process for both the algorithms is shown in FIG. 5 and FIG. 6, and explained in the description of drawings.

F. Redundant Data Delivery—A Security Improvement Concept

Redundant Data Delivery considerably improves security of electronic and mobile commerce transactions. Redundant cipher versions of the original data are generated and delivered to the recipient. Before performing encryption, the sender receives a message identifier and a number of version identifiers equal to the number of components in the public key. The sender generates more cipher versions than the number of components of the key. For the excess cipher versions, no computations are performed. They are generated just by random filling of bytes. The sender tags the genuine cipher versions with the version identifiers sent by the receiver, and the redundant data versions with some fooling version identifiers. When the receiver receives all the cipher versions, both genuine and redundant, he selects only the genuine versions according to his record of version identifiers for the given message identifier, and decrypts the same into the original message. An attacker who has no previous record of the genuine version identifiers can not distinguish between the genuine and redundant versions.

Even for an aggressive attacker who has a mechanism by which he can catch all traffic for a given destination, it is practically not feasible to obtain the original message. Especially in the Relative Composite-key Encryption scheme, even a key as small as 10 bits long with 15 components gives enough security and speed to the mobile communications when 15 redundant cipher versions are delivered. An attacker in this case has to select 15 genuine cipher versions out of total 30 versions leading to 30-C-15 (binomial coefficient), that is, nearly 1.5 billion combinations. This needs the same number of multiplicative modular operations to obtain the original message. Elimination of the source address in the packet headers further increases the combinations to be selected by the attacker, as the size of traffic at the receiver's host, from which the combinations have to be selected, is pretty high since other traffic is mingled with the actual message packets. Source address may be included in the message body itself for identifying the sender.

G. Anonymity as Another Means of Security

The security of communications may further be improved by receiving the cipher versions at two different hosts. At least one cipher version must be received at a secret host that is not transparent to the public, and all the remaining versions at the main host, which is usually the business server. The cipher versions received at the secret host may be further encrypted by a symmetric key encryption algorithm like DES and reflected to the main host, where it would be decrypted by the same algorithm before participating in the computations of the Absolute Public-key Algorithm. Symmetric key encryption by DES does not cause any practical problems like key management, as the same party owns both the hosts. As at least one cipher version is shrouded by DES encryption, even an attacker capturing all the versions near the main receiving host can not obtain the original message with the compromised Robust Private-key.

For maintaining a secret host, one may have a dynamic IP address allocated for his machine by his ISP. Another means to hide the secret server from the public is to use Network Address Translation, which allows an organization to present itself to the Internet with one address. As a result people can not identify computers on network and capture any details of their location, IP address etc.

H. Implementing at Browser Level

Absolute Public-key Algorithm can be implemented within browsers like Netscape Navigator and Internet Explorer to perform encryption in the background and avoid any user interaction.

I. Digital Signatures and Certificates

Similar to public key cryptography, absolute public key cryptography also supports digital signatures and certificates for message integrity and non-repudiation respectively. Hash functions can be run to generate a message digest to verify the originality of the messages received and establish non-repudiation.

Figure 1:
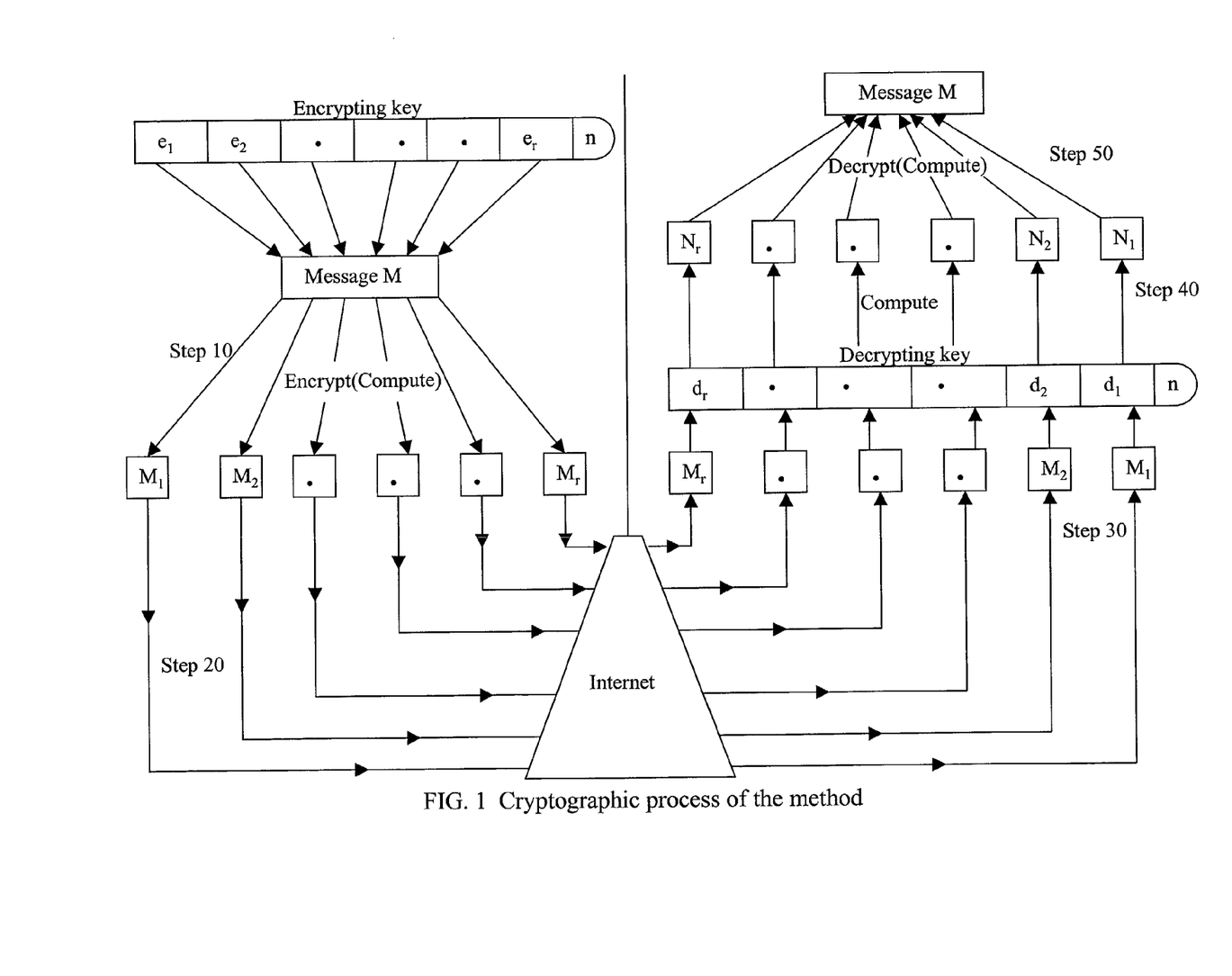
FIG. 1 Cryptographic process of the method

FIG. 1 shows the cryptographic process of the method. It shows the encrypting and decrypting keys with their components. Each component of the encrypting key works on the message and generates an individual encrypted version of it. Step.10 shows the encryption and the output of it as different cipher versions, $M_1, M_2, \ldots, M_r$. Step.20 shows passing of these versions independently to the Internet. Each of these versions travel independently across the Internet medium and finally reach the destination machine. Step.30 shows the collection of these versions at the destination. In step.40, over each of these versions, an exponential modular operation is performed with the corresponding decrypting key component. The output of step.40 is shown as $N_1, N_2, \ldots, N_r$. Step.50 shows the final decryption of these values into the original message, which involves a multiplicative modular operation on these values.

Figure 2:
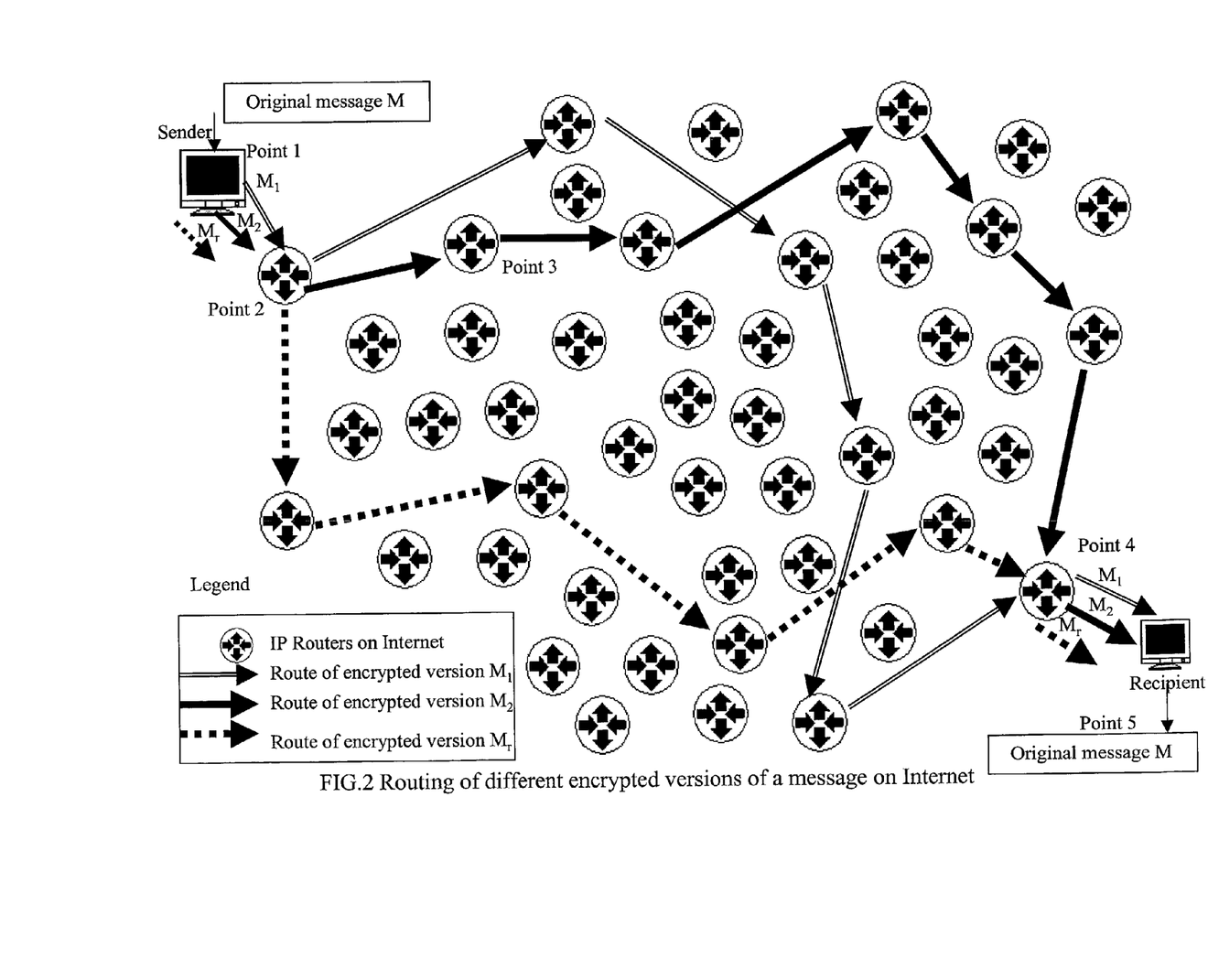
FIG. 2 Routing of different encrypted versions of a message on Internet

FIG. 2 shows the routing of different encrypted versions of a message on the Internet. It shows the network of several IP routers on the Internet, through which different cipher versions of the message take different routes to the destination depending upon the network condition and traffic load at different routers on the Internet. The three types of arrows represent three different cipher versions of the message. Each sequence of arrows shows the routing path of a cipher version. Point.1 represents the sender's machine. Point.2 represents the sender's router through which he directly connects to the Internet. Point.3 represents an intermediary router on the Internet, which is not under the sender's or recipient's control. Point.4 represents the recipient's router while point.5 represents the recipient's machine, where all the encrypted versions are collected and decrypted in to the original message.

Figure 3:
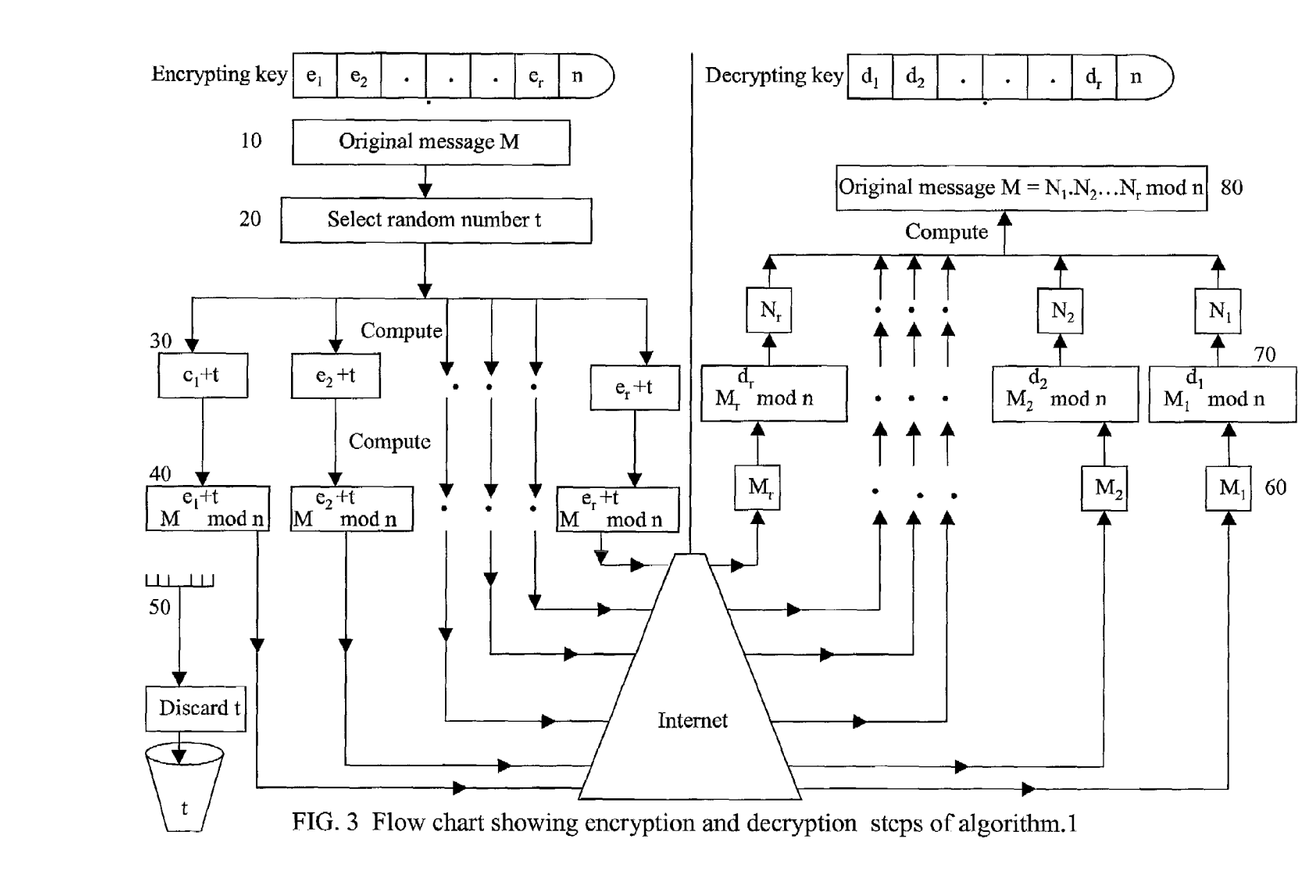
FIG. 3 Flow chart showing encryption and decryption steps of algorithm.1

FIG. 3 shows the flow chart of algorithms in which blinding is performed on the encrypting key components before encryption. Shown at the top are the encrypting and decrypting keys. The flow starts from step.10, where the original message is made ready for encryption. At step.20, a random number t is selected. At step.30, blinding is performed by adding a random number to each of the encrypting key components. The blinded key components are $e_1+t, e_2+t, \ldots, e_r+t$. Step.40 shows the exponential modular operations performed on the original message using each blinded component of the encrypting key to produce different cipher versions. At step.50, the random value t is discarded. Step.60 shows the collection of all the cipher versions of the message at the recipient's machine. Step.70 shows the exponential modular operations performed on each of the collected versions using the corresponding decrypting key components. The output is shown as N.sub.1, N.sub.2, . . . , N.sub.r. Step.80 shows computing the original message from the output of step.70. The computation involves multiplicative modular operations on the output values of step.70.

Figure 4:
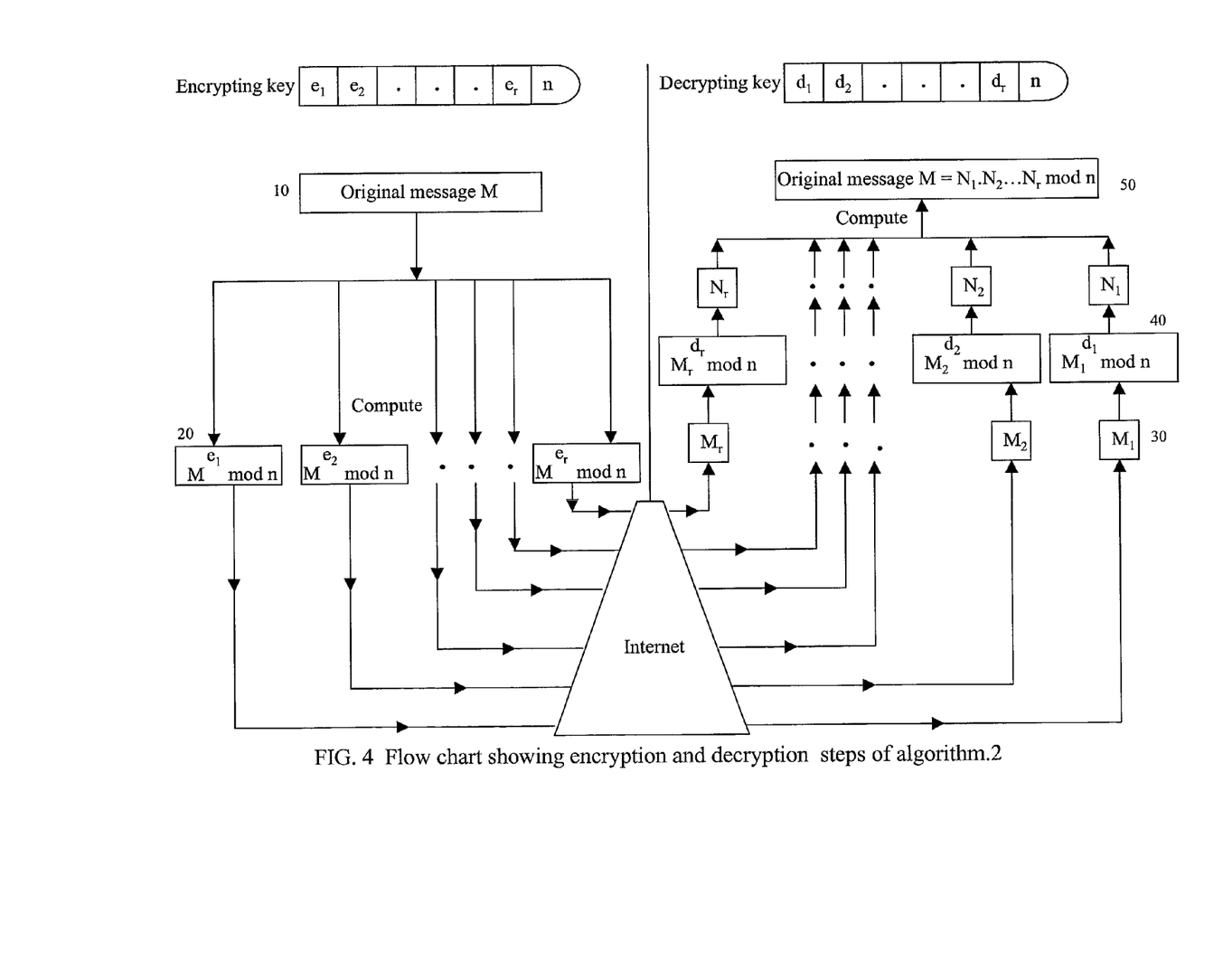
FIG. 4 Flow chart showing encryption and decryption steps of algorithm.2

FIG. 4 shows the flow chart for algorithm.2 in which no blinding is performed. At step.10, the original message is made ready for encryption. At step.20, the message is encrypted into a number of cipher versions by performing exponential modular operations with each component of the encrypting key. At step.30, all these encrypted versions are collected at the recipient's machine via the Internet. Step.40 shows the exponential modular operations on each of these versions using the corresponding decrypting key components. The output is shown as N.sub.1, N.sub.2, . . . , N.sub.r. Step.50 shows computing the original message from the output of step.40. The computation involves multiplicative modular operations on the output values of step.40.

FIG. 5 shows flow chart of key generation for algorithm. 1. At step.10 two prime numbers p and q, and an integer k.sub.2 are selected. At step.20, the key modulus, n and the Euler Totient Function, phi are computed. At step.30, p and q are discarded. At step.40, d.sub.1, the first component of the decrypting key is selected. At step.50, the greatest common divisor of d.sub.1 and phi is computed. If the value is equal to 1, the control goes to step.60, else steps.40 and 50 are repeated. At step.60, all the remaining, except the last, components of the decrypting key are selected. At step.70 the last component of the decrypting key is computed. At step.80, all the encrypting key components, except the first, are selected. At step.90, the value F is computed, which is a function of all components of the encrypting and decrypting keys, except the first ones. Step.100 shows the computation of the first component of encrypting key, which involves finding a multiplicative inverse using Extended Euclid's Algorithm. At step. 110, the Euler Totient Function, phi is discarded. At step.120, all the key components are properly arranged to form the encrypting and decryption keys.

FIG. 6 shows flow chart of key generation for algorithm.2. At step.10 two prime numbers p and q are selected. At step.20, the key modulus, n and the Euler Totient Function, phi are computed. At step.30, p and q are discarded. At step.40, all the components of the encrypting key are selected. At step.50, the greatest common divisor (gcd) of each component with the Euler Totient Function, phi is computed. If any of the gcd's is equal to 1, step.40 and 50 are repeated for that particular component. When all the gcd's computed are greater than 1, control goes to step.60, where a global gcd, G of all the previously computed gcd's is computed. If the global gcd value equals 1, control goes to step.70, else steps.40 and 50 are repeated only for the first component of the encrypting key, and G is computed again. At step.70, all the decrypting key components, except the first, are selected. At step.80, the value F is computed, which is a function of all components of the encrypting and decrypting keys, except the first ones. Step.90 shows the computation of the first component of encrypting key, which involves finding a multiplicative inverse using Extended Euclid's Algorithm. At step.100, the Euler Totient Function, phi is discarded. At step.110, all the key components are properly arranged to form the encrypting and decryption keys.

REFERENCES—U.S. PATENTS

U.S. Pat. No. 6,081,598 Cryptographic system and method with fast decryption Dai
U.S. Pat. No. 4,405,829 Cryptographic communications system and method Rivest, et al

REFERENCES—OTHERS

"Cryptography And Network Security, Principles and Practice", William Stallings, Prentice Hall, Second Edition.
"Data Security", Janet Endrijonas. Prima Publishing.,1998.
"Digital Money, The new era of Internet commerce", Daniel C. Lynch, Leslie Lundquist. John Wiley & Sons, Inc., 1996.
"TCP/IP—Network Administration", Craig Hunt, O'Reilly & Associates, Inc., 1993.
"Smart Cards". Henry Dreifus, J. Thomas Monk., John Wiley & Sons, Inc, 1998.
"Current Public-Key Cryptographic Systems". Available from http://www.certicom.com/resources/download/EccWhite2.zip, pages 7–8.
"Lesson 35: Routing Protocols". Available from http://www.networkmagazine.com/static/tutorial/internetworking/9106tut.htm.
"Source Address Spoofing". Available from http://www.networkmagazine.com/article/NMG20000517S0167.
"Introduction to Routing". Available from http://www.corecom.com/html/OSNconnexions.html.
"Internet security". Available from http://www.coolboard.com.
"IP ADDRESS". Available from http://www.swynk.com/friends/dombroski/article4/main.asp.
"The Internet As A Source Of Regulatory Arbitrage". Available from http://www.law.miami.edu/~froomkin/articles/arbitr.htm.

What I claim is:

1. In a system for sending messages over a network between first and second computing units, method comprising the following steps:
(a). computing r components of encrypting key e.sub.1, e.sub.2, . . . , e.sub.r and r components of decrypting key d.sub.1, d.sub.2, . . . , d.sub.r according to the following relations:
(e.sub.1).(d.sub.1)+(e.sub.2).(d.sub.2)+ . . . +(e.sub.r).(d.sub.r)=(k.sub.1).(p−1).(q−1)+1 and
(d.sub.1)+(d.sub.2)+ . . . +(d.sub.r)=(k.sub.2).(p−1).(q−1), where:
p and q are two prime numbers;
k.sub.1 and k.sub.2 are suitable integers; and
encrypting a message M into r cipher versions M.sub.1, M.sub.2, . . . , M.sub.r using the r blinded components of the encrypting key e.sub.1+t, e.sub.2+t, . . . ,e.sub.r+t as follows:
M.sub.1=(M.sup.(e.sub.1+t))mod n
M.sub.2=(M.sup.(e.sub.2+t))mod n
. . .
M.sub.r=(M.sup.(e.sub.r+t))mod n, where:
n=p.q;
t is a random number generated on an encrypting unit and discarded after encryption is complete;
mod represents the remainder left when left hand operand is divided by right hand operand;

(b). delivering all the cipher versions of the message individually to a destination unit in source routing mode, or hop-by-hop routing mode with a small time gap between every two consecutive cipher versions;

(c). collecting all the cipher versions at the destination unit;

(d). computing r number of values $N_1, N_2, \ldots, N_r$ using r components $d_1, d_2, \ldots, d_r$ of decrypting key, where:

$N_1 = ((M_1)^{d_1}) \mod n$
$N_2 = ((M_2)^{d_2}) \mod n$
$\ldots$
$N_r = ((M_r)^{d_r}) \mod n$, where:

n is the same composite number as used for encryption;

(e). reproducing the original message M as follows:
$M = (N_1).(N_2) \ldots (N_r) \mod n$, where:
n is the same composite number as used for encryption;
wherein r=2.

2. A system of claim 1, wherein at lest one encrypted version of the message is bypassed to a secret host that is not exposed to the public while the remaining are directed to the main host, where the bypassed cipher versions are also collected from the secret host.

3. A system of claim 1, wherein redundant cipher versions of a message are generated and delivered to the destination, where they are identified and discarded before decryption.

4. A system of claim 2, wherein the cipher version received at a secret host is further encrypted in a symmetric key encryption method before sending it to the main host, where it is decrypted by the same symmetric key.

5. A system for sending messages over a communications channel, comprising:

an encoder to transform a message M into two or more cipher versions $M_1, M_2, \ldots, M_r$ as follows:

$M_1 = (M^{(e_1+t)}) \mod n$
$M_2 = (M^{(e_2+t)}) \mod n$
$\ldots$
$M_r = (M^{(e_r+t)}) \mod n$, where:

t is a random number generated on an encrypting machine;

$e_1, e_2, \ldots, e_r$ are encrypting key components computed according to the relations:

$(e_1).(d_1) + (e_2).(d_2) + \ldots + (e_r).(d_r) = (k_1).(p-1).(q-1) + 1$
and
$(d_1) + (d_2) + \ldots + (d_r) = (k_2).(p-1).(q-1)$;

p and q are prime numbers, and n=p.q;

$k_1$ and $k_2$ are suitable integers;

$(d_1), (d_2), \ldots, (d_r)$ are components of the other key used by the recipient for decrypting the cipher versions into the original message;

a decoder coupled to receive the cipher versions $M_1, M_2, \ldots, M_r$ from the communications channel and to transform them back to the original message M, where M is a function of $M_1, M_2, \ldots, M_r$ and computed as follows:

$N_1 = ((M_1)^{d_1}) \mod n$
$N_2 = ((M_2)^{d_2}) \mod n$
$\ldots$
$N_r = ((M_r)^{d_r}) \mod n$
$M = (N_1).(N_2) \ldots (N_2) \mod n$,
wherein r=2.

6. A computer-readable medium having computer-executable instructions causing a computer to compute the following: key components $(e_1), (e_2), \ldots, (e_r)$ and $(d_1), (d_2), \ldots, (d_r)$ according to the relations as follows:

$(e_1).(d_1) + (e_2).(d_2) + \ldots + (e_r).(d_r) = (k_1).(p-1).(q-1) + 1$ and $(d_1) + (d_2) + \ldots + (d_r) = (k_2).(p-1).(q-1)$, where: p and q are prime numbers; and $k_1$ and $k_2$ are suitable integers; cipher versions of the original message M as follows:

$M_1 = (M^{(e_1+t)}) \mod n$  $M_2 = (M^{(e_2 t)}) \mod n \ldots M_r = (M^{(e_r+t)}) \mod n$, where: t is a random number generated on an encrypting machine and discarded after encryption is complete, original message as follows: $N_1 = ((M_1)^{d_1}) \mod n$ $N_2 = ((M_2)^{d_2}) \mod n \ldots N_r = ((M_r)^{d_r}) \mod n$ $M(N_1).(N_2) \ldots (N_r) \mod n$.

* * * * *